US009430352B2

(12) United States Patent
Yamauchi et al.

(10) Patent No.: US 9,430,352 B2
(45) Date of Patent: Aug. 30, 2016

(54) INFORMATION PROCESSING APPARATUS, COMPUTER PRODUCT, AND INFORMATION PROCESSING METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 13/890,920

(22) Filed: May 9, 2013

(65) Prior Publication Data

US 2013/0262905 A1 Oct. 3, 2013

Related U.S. Application Data

(63) Continuation of application No. PCT/JP2010/070317, filed on Nov. 15, 2010.

(51) Int. Cl.
*G06F 11/30* (2006.01)
*G06F 1/32* (2006.01)
(Continued)

(52) U.S. Cl.
CPC ......... *G06F 11/3062* (2013.01); *G06F 1/3206* (2013.01); *G06F 1/329* (2013.01); *G06F 9/4887* (2013.01); *G06F 9/4893* (2013.01); Y02B 60/144 (2013.01)

(58) Field of Classification Search
CPC ............. G06F 11/3062; G06F 9/5038; G06F 9/4893; G06F 9/4887; G06F 1/329; G06F 1/3206; G06F 9/3009; G06F 9/3851; G06F 2209/5018; Y02B 60/144
See application file for complete search history.

(56) References Cited

U.S. PATENT DOCUMENTS

2003/0126476 A1* 7/2003 Greene ...................... 713/300
2005/0283629 A1* 12/2005 Tanaka et al. ............. 713/322
(Continued)

FOREIGN PATENT DOCUMENTS

EP 0 794 481 A2 9/1997
JP 07-168726 A 7/1995
(Continued)

OTHER PUBLICATIONS

Liu, et al., "Scheduling Algorithms for Multiprogramming in a Hard-Real-Time Environment," Journal of the Association for Computing Machinery, vol. 20, No. 1, Jan. 1973, pp. 46-61.
(Continued)

*Primary Examiner* — Kim Huynh
*Assistant Examiner* — Siamak S Hefazi
(74) *Attorney, Agent, or Firm* — Arent Fox LLP

(57) ABSTRACT

An information processing apparatus includes a processor configured to detect an unexecuted first thread and an unexecuted second thread; calculate standby power consumption of the first thread in a case of executing the second thread followed by the first thread, based on an execution period of the second thread and standby power consumption per unit time of the first thread; calculate standby power consumption of the second thread in a case of executing the first thread followed by the second thread, based on an execution period of the first thread and standby power consumption per unit time of the second thread; and determine an order of execution of the first thread and the second thread, based on comparison of the standby power consumption of first thread and the standby power consumption of the second thread.

6 Claims, 14 Drawing Sheets

(51) Int. Cl.
*G06F 9/48* (2006.01)
*G06F 9/30* (2006.01)
*G06F 9/38* (2006.01)
*G06F 9/50* (2006.01)

(56) References Cited

U.S. PATENT DOCUMENTS

2006/0155415 A1\* 7/2006 Lefurgy et al. ............... 700/130
2007/0204270 A1\* 8/2007 Shin .............................. 718/103
2010/0125710 A1\* 5/2010 Mera et al. ................... 711/159

FOREIGN PATENT DOCUMENTS

JP 09-297688 A 11/1997
JP 63-068934 A 3/1998
JP 2000-276360 A 10/2000

OTHER PUBLICATIONS

Miyakawa, et al., "Preliminary Evaluation of the Per-Process Power Consumption Control Mechanism," IPSJ SIG Technical Reports, Aug. 3, 2005, vol. 2005, No. 79, pp. 65-72.
Terada, et al., "Resource Allocation with Standby Power for Low Power Consumption and QoS-based Fairness," IEICE Technical Reports, Jun. 2, 2008, vol. 108, No. 178, pp. 13-18.

\* cited by examiner

| THREAD IDENTIFICATION INFORMATION | PRIORITY LEVEL | DEADLINE | EXECUTION PERIOD | STANDBY POWER CONSUMPTION |
|---|---|---|---|---|
| THREAD #0 | HIGH PRIORITY | 10 [ms] | 5 [ms] | 100 [mW/ms] |
| THREAD #1 | LOW PRIORITY | - | 3 [ms] | 100 [mW/ms] |
| THREAD #2 | LOW PRIORITY | - | 4 [ms] | 50 [mW/ms] |
| THREAD #3 | LOW PRIORITY | - | 2 [ms] | 80 [mW/ms] |
| THREAD #4 | LOW PRIORITY | - | 5 [ms] | 70 [mW/ms] |
| ... | ... | ... | ... | ... |

FIG.5

| CPU IDENTIFICATION INFORMATION | LOCK | ASSIGNED THREAD IDENTIFICATION | EXECUTION STATUS |
|---|---|---|---|
| CPU #0 | 0 | THREAD #1 | exe |
| | | THREAD #3 | exe |
| CPU #1 | 0 | THREAD #2 | exe |
| | | THREAD #4 | exe |

FIG.8

| CPU IDENTIFICATION INFORMATION | LOCK | ASSIGNED THREAD IDENTIFICATION | EXECUTION STATUS |
|---|---|---|---|
| CPU #0 | 0 | THREAD #1 | exe |
|  |  | THREAD #3 | proh |
|  |  | THREAD #0 | proh |
| CPU #1 | 0 | THREAD #2 | exe |
|  |  | THREAD #4 | exe |

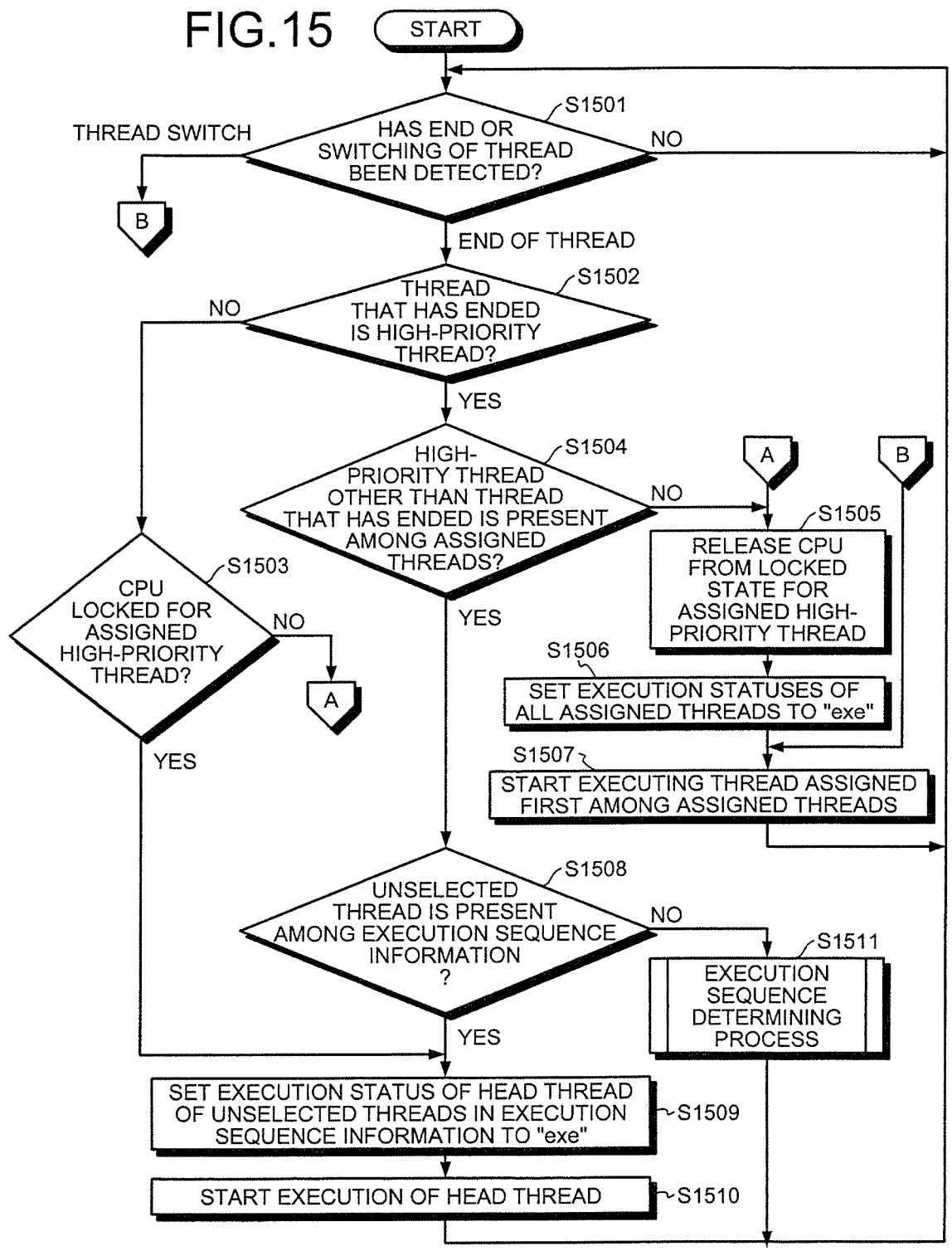

INFORMATION PROCESSING APPARATUS, COMPUTER PRODUCT, AND INFORMATION PROCESSING METHOD

CROSS REFERENCE TO RELATED APPLICATIONS

This application is a continuation application of International Application PCT/JP2010/070317, filed on Nov. 15, 2010 and designating the U.S., the entire contents of which are incorporated herein by reference.

FIELD

The embodiment discussed herein is related to an information processing apparatus, a computer product, and an information processing method that control thread execution.

BACKGROUND

According to a conventional technique (first conventional technique), when multiple threads are assigned to CPUs of a single-core processor system or multi-core processor system, the order of execution of threads is determined based on priority levels defined for individual threads (see, for example, Japanese Laid-Open Patent Application No. S63-068934).

According to another technique (second conventional technique), when multiple threads are assigned, each of the threads is executed for a given interval sequentially (see, for example, Japanese Laid-Open Patent Application No. 2000-276360 and C. L. Lui, James W. LAYLAND, "Scheduling Algorithms for Multiprogramming in a Hard-Real-Time Environment", Journal of the Association for Computing Machinery, Vol. 20, No. 1, January 1973).

The first conventional technique, however, poses a problem that when the power consumed for standby by a low-priority thread among multiple threads is large, power consumption increases. The second conventional technique poses a problem that because threads are switched at each given interval, contention occurs over access of a cache in a CPU in which execution information of each thread is temporarily stored.

For example, during execution of a given thread by the CPU, execution information of the given thread is stored to the cache. When the given thread is switched with another tread to be executed, the execution information of the given thread in the cache is overwritten by execution information for the other thread. Then, when the other thread is switched with the given thread to be executed, the execution information of the other thread in the cache is overwritten by the execution information for the given thread. This process leads to a problem of a decline in execution performance and a decrease in throughput.

SUMMARY

According to an aspect of an embodiment, an information processing apparatus includes a processor configured to detect an unexecuted first thread and an unexecuted second thread; calculate standby power consumption of the first thread in a case of executing the second thread followed by the first thread, based on an execution period of the second thread and standby power consumption per unit time of the first thread; calculate standby power consumption of the second thread in a case of executing the first thread followed by the second thread, based on an execution period of the first thread and standby power consumption per unit time of the second thread; and determine an order of execution of the first thread and the second thread, based on comparison of the standby power consumption of first thread and the standby power consumption of the second thread.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of an example of an assignment management table 500;

FIG. 8 is an explanatory diagram of an example of updating of the assignment management table 500;

FIG. 15 is a flowchart of an information processing procedure executed by each OS when a thread is completed.

DESCRIPTION OF EMBODIMENTS

Preferred embodiments of an information processing apparatus, program, and method according to the present invention will be explained with reference to the accompanying drawings.

Figure 1:
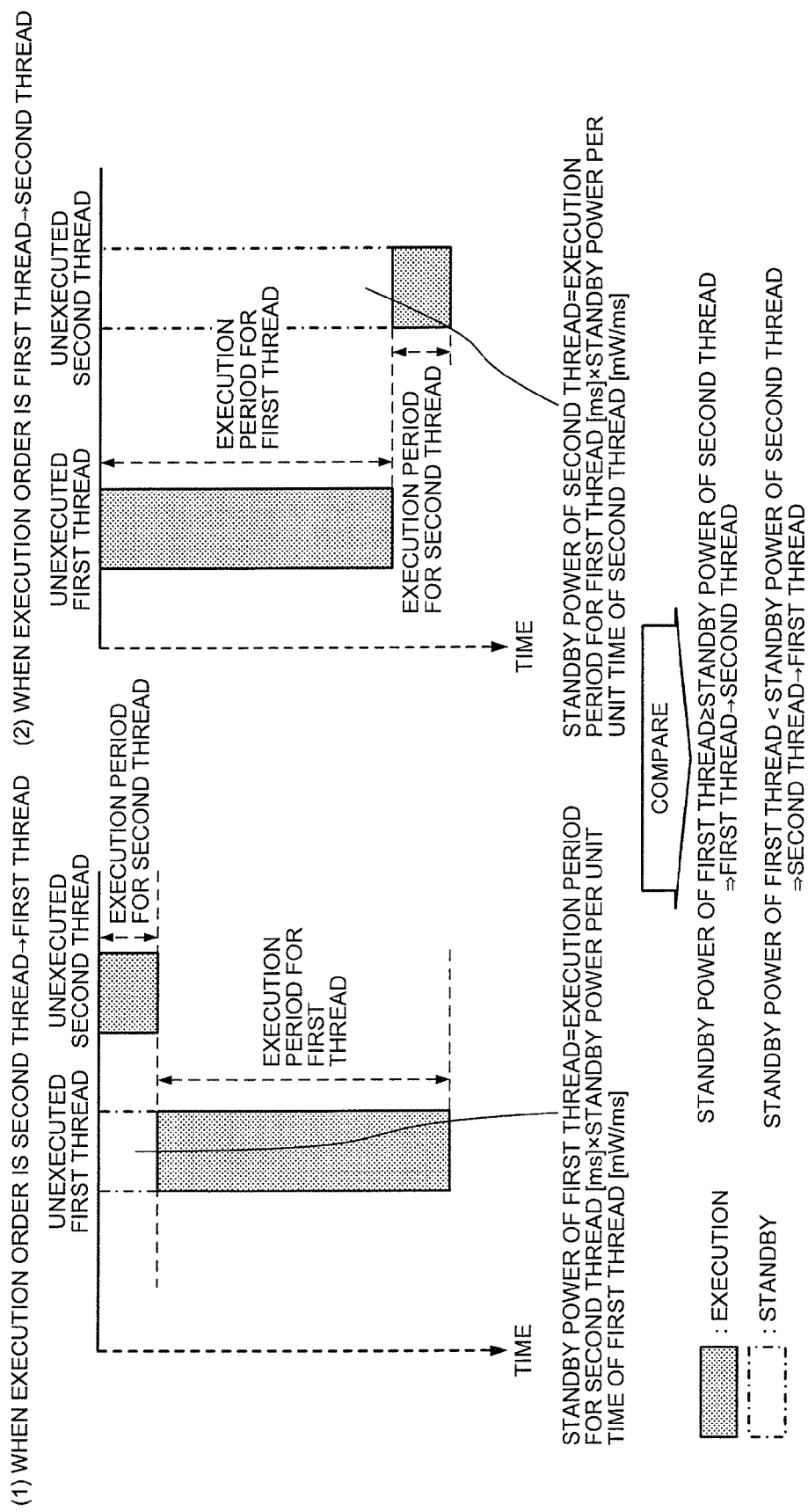
FIG. 1 is an explanatory diagram of one embodiment of the present invention.

FIG. 1 is an explanatory diagram of one embodiment of the present invention. An unexecuted first thread and an unexecuted second thread will be described as an example. In FIG. 1, the amount of power consumed during standby (standby power consumption) is calculated for each execution-order-based thread combination before execution of the first and second threads, and an execution sequence is determined based on the result of the calculation.

(1) When the execution sequence is "the second thread→the first thread", the first thread stands by during execution of the second thread. The standby power consumption of the first thread is given by the following equation.

Standby power of first thread=execution period for second thread [ms]×stand-by power per unit time of first thread [mW/ms]

(2) When the execution order is "the first thread→the second thread", the second thread stands by during execution of the first thread. The standby power consumption of the second thread is given by the following equation.

Stand-by power of second thread=execution period for first thread [ms]×stand-by power per unit time of second thread [mW/ms]

The information processing apparatus compares the standby power consumption of the first thread and the standby power consumption of the second thread. If the standby power consumption of the first thread greater than or equal to the standby power consumption of the second thread, the information processing apparatus determines the execution sequence to be "the first thread→the second thread". If the standby power consumption of the first thread is less than the standby power consumption of the second thread, the information processing apparatus determines the execution sequence to be "the second thread→the first thread".

Figure 2:
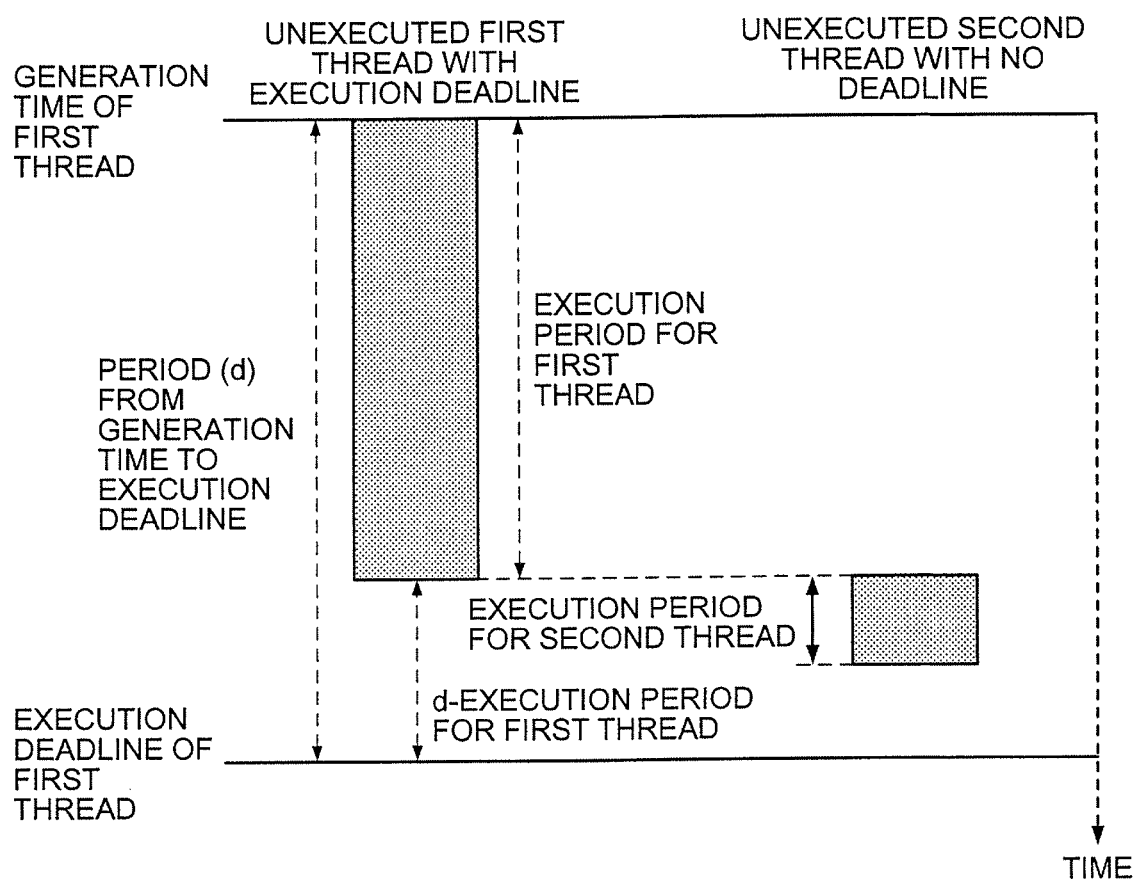
FIG. 2 is an explanatory diagram of a case where an execution deadline is defined for a first thread.

FIG. 2 is an explanatory diagram of a case where an execution deadline is defined for the first thread. FIG. 2 depicts an example in which an execution deadline is defined for the first thread while no execution deadline is defined for the second thread. An execution deadline defined for the first thread means that a period from the generation time of the first thread to the execution deadline for the first thread is defined.

If a period (d) from the generation time of the first thread to the execution deadline for the first thread is defined, whether the execution deadline for the first thread can be met if the execution sequence is the second thread followed the first thread is determined, that is, whether the following inequality is satisfied is determined.

d−execution period for first thread>execution period for second thread

If "d−execution period for first thread>execution period for second thread" is satisfied, as indicated in FIG. 2, the information processing apparatus calculates the standby power consumption of a standby thread for each execution-order-based thread combination and determines the execution sequence, as described with reference to FIG. 1. If "d−execution period for first thread≤execution period for second thread" is true, and if execution sequence is "the second thread→the first thread", the execution deadline for the first thread cannot be met. The information processing apparatus, therefore, determines the execution sequence to be "the first thread→the second thread".

In this embodiment, a multi-core processor system is described as an example of the information processing apparatus. In the multi-core processor system, a multi-core processor is a processor equipped with multiple cores. A single processor equipped with multiple cores and a processor group including parallel single-core processors are both regarded as the multi-core processor since both have multiple cores. For the sake of convenience in description, a processor group of parallel single-core processors will be described in this embodiment.

Figures 3, 4:
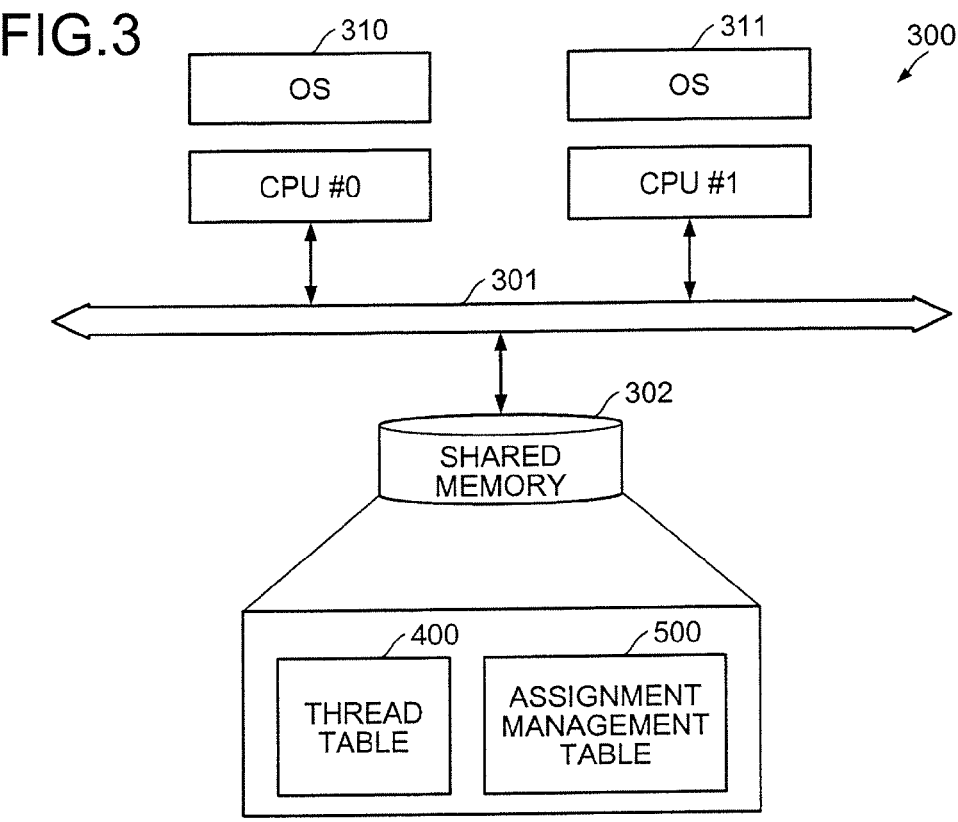
FIG. 3 is a block diagram of hardware of an information processing apparatus.
FIG. 4 is an explanatory diagram of an example of a thread table 400.

FIG. 3 is a block diagram of hardware of the information processing apparatus. In FIG. 3, an information processing apparatus 300 includes a CPU #0, a CPU #1, and a shared memory 302. The CPU #0, the CPU #1, and the shared memory 302 are interconnected through a bus 301.

The CPU #0 has a cache, a register, and a core. The CPU #1 has a cache, a register, and a core. The CPU #0 executes an OS 310 and supervises overall control over the information processing apparatus 300. The OS 310 serving as a master OS has a function of determining to which CPU a thread is to be assigned, and executes threads assigned to the CPU #0. The CPU #1 runs an OS 311, which serves as a slave OS and executes threads assigned to the CPU #1.

The shared memory 302 has, for example, a read only memory (ROM), a random access memory (RAM), and a flash ROM. For example, the flash ROM stores a boot program; the ROM stores application software; and the RAM is used as a work area of the CPUs #0 and #1. A program stored in the shared memory 302 is loaded onto a CPU, where the program causes the CPU to execute a coded process. The shared memory 302 stores, for example, a thread table 400 and an assignment management table 500.

FIG. 4 is an explanatory diagram of an example of the thread table 400. The thread table 400 has a thread identification information field 401, a priority level field 402, a deadline field 403, an execution period field 404, and a standby power consumption field 405. The thread identification information field 401 retains identification information of each thread. The priority level field 402 retains information indicating whether the priority level of the thread whose identification information is indicated in the thread identification information field 401 is high or low. In this field, "high priority" is entered for a thread of which the priority level is high while "low priority" is entered for a thread of which the priority level is not high.

The deadline field 403 indicates a period from a generation time at which a thread is generated to an execution deadline for the thread (the period being referred to as "deadline"). The execution period field 404 indicates an execution period for the thread whose identification information is indicated in the thread identification information field 401. The standby power consumption field 405 indicates a standby power consumption value per unit time for the thread whose identification information is indicated in the thread identification information field 401.

In the case of the thread #0, the table indicates that the thread #0 is a high-priority thread, having a deadline of 10 [ms], an execution period of 5 [ms], and standby power consumption per unit time of 100 [mW/ms].

FIG. 5 is an explanatory diagram of an example of the assignment management table 500. The assignment management table 500 has a CPU identification information field 501, a LOCK field 502, an assigned thread identification field 503, and an execution status field 504. The CPU identification information field 501 retains identification information of CPUs.

The LOCK field 502 retains information indicating whether the CPU whose identification information is indicated in the CPU identification information field 501 is locked. Indicating whether a CPU is locked means indicating whether a high-priority thread is assigned to the CPU. If no high-priority thread is assigned to the CPU, "0" is entered in the LOCK field 502. If a high-priority thread is assigned to the CPU, "1" is entered in the LOCK field 502.

The assigned thread identification field 503 retains identification information of a thread assigned to the CPU whose identification information is indicated in the CPU identification information field 501. The execution status field 504 indicates the execution status of each thread whose identification information is indicated in the assigned thread identification field 503. In this field, either "exe (execution)" or "proh (prohibit)" is entered as an execution status. "exe" indicates that the thread is executable, while "proh" indicates that execution of the thread is prohibited.

Each OS refers to the assignment management table 500, and finds that the threads #1 and #3 are assigned to the CPU #0 and threads #2 and #4 are assigned to the CPU #1. Because threads assigned to each CPU are entered into the assigned thread identification information field in the order of assignment of the threads, each OS can identify the order of assignment of threads by sequentially accessing entries of threads in the assigned thread identification information field in the assignment management table 500.

Figure 6:
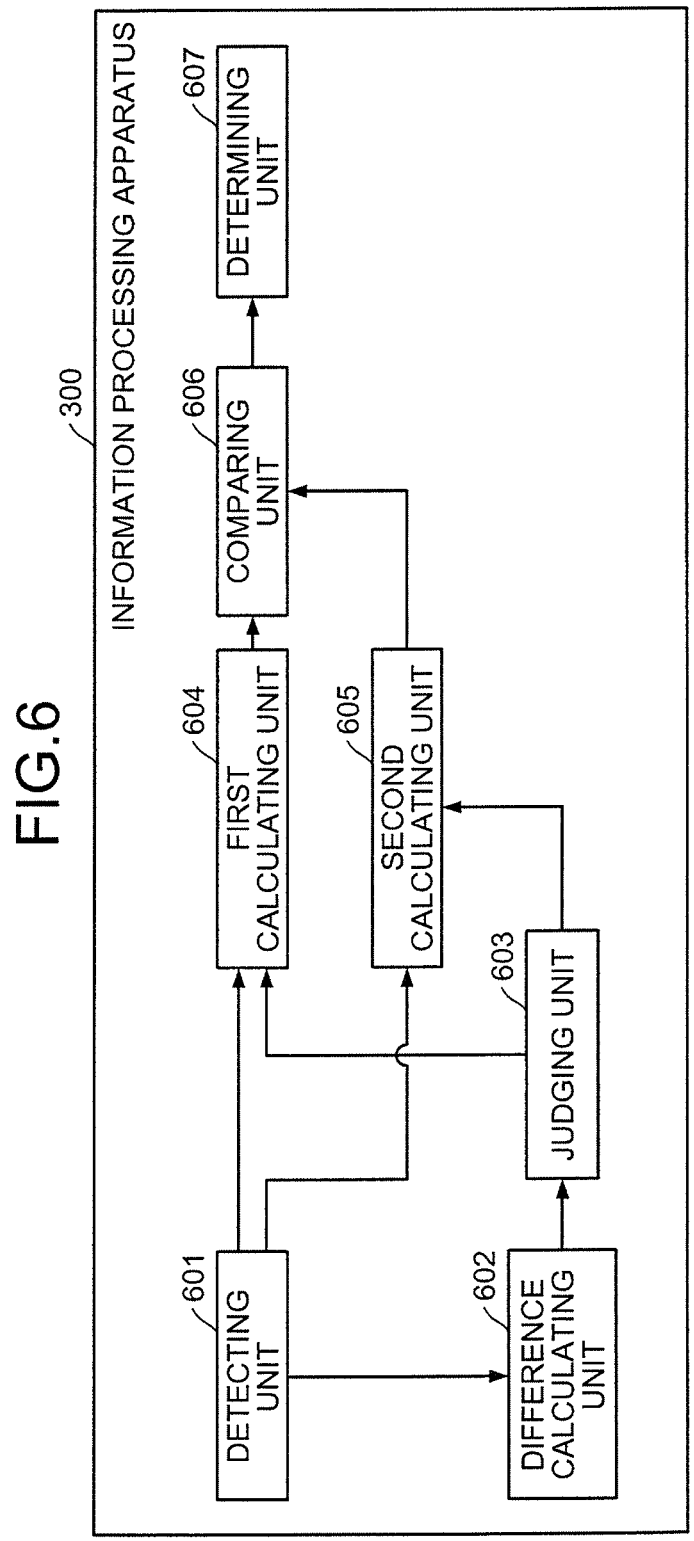
FIG. 6 is a functional diagram of an information processing apparatus 300.

FIG. 6 is a functional diagram of the information processing apparatus 300. The information processing apparatus 300 includes a detecting unit 601, a difference calculating unit 602, a judging unit 603, a first calculating unit 604, a second calculating unit 605, a comparing unit 606, and a determining unit 607. For example, an information processing program stored in the shared memory 302 and having functions of the detecting unit 601 to the determining unit 607 is loaded onto the CPU #0. The CPU #0 then executes a process coded in the program to implement the functions of the detecting unit 601 to the determining unit 607.

The detecting unit 601 detects an unexecuted first thread and an unexecuted second thread.

The first calculating unit 604 multiplies the execution period for the second thread detected by the detecting unit 601 and the standby power consumption per unit time of the first thread detected by the detecting unit 601. The first calculating unit 604 thus calculates the standby power consumption of the first thread in a case of execution of the second thread followed by the first thread.

The second calculating unit 605 multiplies the execution period for the first thread and the standby power consumption per unit time of the second thread and thereby, calculates the standby power consumption of the second thread in a case of execution of the first thread followed by the second thread.

The comparing unit 606 compares the standby power consumption of the first thread calculated by the first calculating unit 604 and the standby power consumption of the second thread calculated by the second calculating unit 605.

The determining unit 607 determines the order of execution of the first thread and the second thread, based on the result of comparison by the comparing unit 606.

If the comparing unit 606 gives a comparison result indicating that the standby power consumption of the first thread is greater than or equal to the standby power consumption of the second thread, the determining unit 607 determines the order of execution to be the first thread followed by the second thread.

If the comparing unit 606 gives a comparison result indicating that the standby power consumption of the first thread is less than the standby power consumption of the second thread, the determining unit 607 determines the order of execution to be the second thread followed by the first thread.

If an execution deadline is defined for the first thread detected by the detecting unit 601, the difference calculating unit 602 calculates a time difference of a period from the generation time to the execution deadline of the first thread and the execution period for the first thread.

The judging unit 603 judges whether the time difference calculated by the difference calculating unit 602 is larger than the execution period for the second thread.

If the judging unit 603 judges the time difference to be larger than the execution period for the second thread, the first calculating unit 604 multiplies the execution period for the second thread and the standby power consumption per unit time of the first thread to calculate the standby power consumption of the first thread.

If the judging unit 603 judges the time difference to be larger than the execution period for the second thread, the second calculating unit 605 multiplies the execution period for the first thread and the standby power consumption per unit time of the second thread to calculate the standby power consumption of the second thread.

If the judging unit 603 judges the time difference to be less than or equal to the execution period for the second thread, the determining unit 607 determines the order of execution to be the first thread followed by the second thread.

Based on the above description, the embodiment will be explained in detail. The embodiment relates to an example in which when a high-priority thread is generated, and the order of execution of a low-priority thread and the high-priority thread is determined. In the embodiment, a CPU to which only the low-priority threads are assigned executes the threads in the order of assignment thereof.

In the embodiment, the order of execution of threads is determined at each CPU to which no high-priority thread is assigned, and a generated high-priority thread (subject thread) is assigned to a CPU that can reduce standby power consumption to the greatest extent.

A method of determining the order of execution will first be described. The OS 310 selects an arbitrary CPU (subject CPU) among CPUs to which no high-priority thread is assigned. The OS 310 identifies a thread assigned to the subject CPU. The OS 310 then performs calculations expressed as the following equations.

$$p\text{total}=0$$

$$r0 = \text{deadline for subject thread} - \text{execution period for subject thread}$$

$$pst\_\text{high (standby power consumption of subject thread)} = r0 \times \text{standby power consumption per unit time of subject thread [mW/ms]}$$

$$pst\_\text{low (stand-by power of assigned thread)} = \text{execution period of subject thread} \times (p1+p2+\ldots pn)$$

In the equations, n denotes the number of assigned threads and 1 to n represent numbers that are appended to the assigned threads in the order of assignment thereof. p1 to pn denote the standby power consumption of the assigned threads. (p1+p2+ . . . pn), therefore, denotes the total of the standby power consumption per unit time of the assigned threads.

The OS 310 determines whether the following inequality is satisfied.

$$r0 > (t1 \vee t2 \vee \ldots \vee tn) \wedge pst\_\text{high} < pst\_\text{low} \qquad (1)$$

In the inequality, ∧ denotes logical product and ∨ denotes logical sum, and t1 to tn denote execution periods for the assigned threads. When the above inequality (1) is true (is satisfied), the OS 310 determines an assigned thread that is a low-priority thread to be executed before the subject thread.

The OS 310 selects a thread of which the standby power consumption per unit time is the greatest among the assigned threads satisfying "r0<(t1∨t2∨ . . . ∨tn)", as a thread to be executed before the subject thread. It is assumed, for example, that a thread (preceding thread) assigned first among the assigned threads is selected as the thread to be executed before the subject thread.

The OS 310 then (a) performs calculations expressed as the following equations.

$$ptotal = ptotal + t1 \times p0 \quad (2)$$

$$pst\_high = pst\_high - t1 \times p0 \quad (3)$$

$$pst\_low = pst\_low - t1 \times p0 \quad (4)$$

$$r0 = r0 - t1 \quad (5)$$

The OS 310 then (b) determined whether the following inequality is satisfied.

$$pst\_high < pst\_low \quad (6)$$

When determining that the above inequality (6) is satisfied, the OS 310 selects a thread of which the standby power consumption per unit time is the greatest among the assigned threads satisfying "r0<(t2∨ . . . ∨tn)", as a thread to be executed after the preceding thread and before the subject thread.

The OS 310 repeats the processes (a) and (b) to determine order of execution of threads in the case of assigning the subject thread to the subject CPU. When determining the order of execution in the case of assigning the subject thread to the subject CPU, the OS 310 selects, as the subject CPU, a CPU yet unselected as a subject CPU from among CPUs to which no high-priority thread is assigned. The OS 310 then determines the order of execution of threads in a case of assigning the subject thread to the selected subject CPU.

Among the CPUs to which no high-priority thread is assigned, the OS 310 determines a CPU having the greatest ptotal value among ptotal values calculated for individual CPUs to be an assignment destination CPU to which the subject thread is to be assigned. The OS 310 then reports the determined order of execution to the assignment destination CPU, and the assignment destination CPU executes threads assigned thereto, based on the reported order of execution.

Detailed description will be made using specific numerical values.

Figure 7:
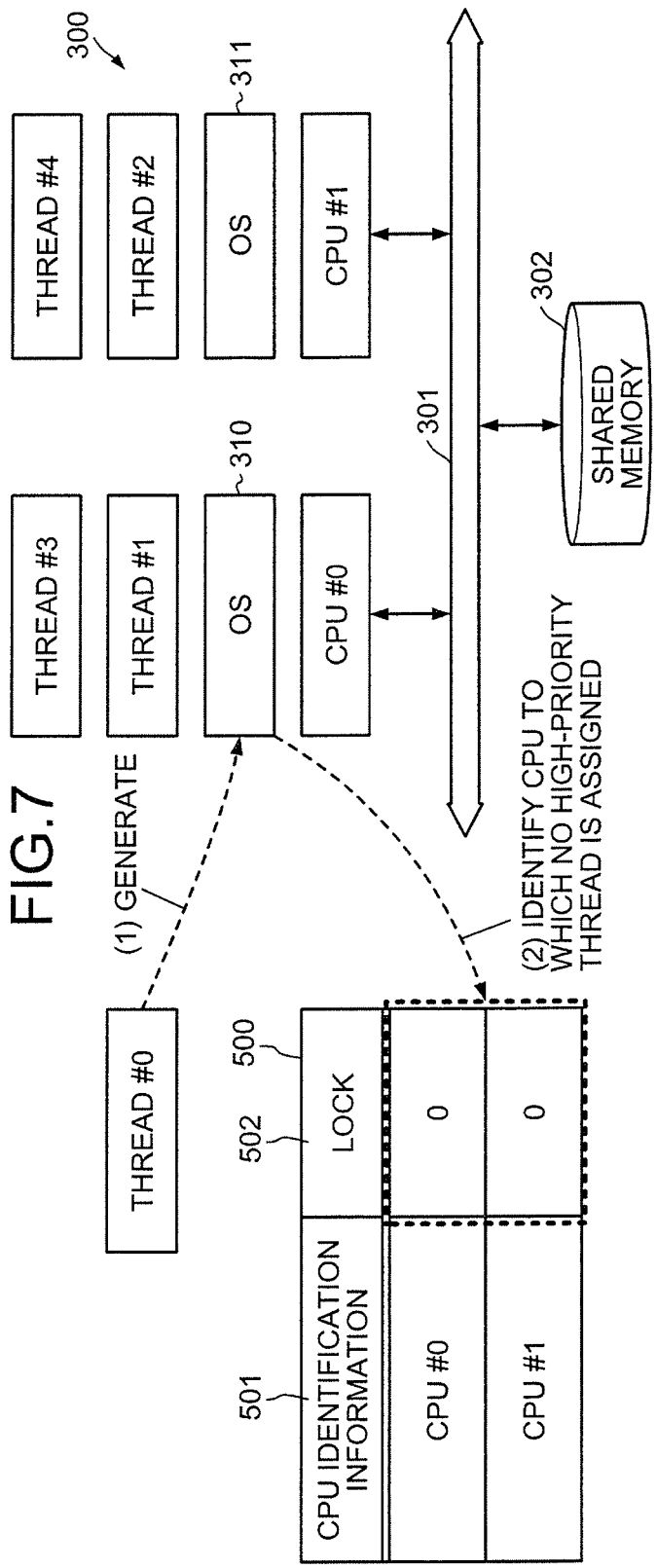
FIG. 7 is an explanatory diagram of an example of detection of the generation of thread #0.

FIG. 7 is an explanatory diagram of an example of detection of the generation of the thread #0. (1) When detecting the generation of the thread #0, the OS 310 determines whether the priority level of the thread #0 is high, based on identification information of the thread #0 in the thread table 400. In this example, the priority level of the thread #0 is determined to be high. The OS 310 then (2) identifies a CPU to which no high-priority thread is assigned among CPUs making up the multi-core processor system, based on the assignment management table 500. In this example, the CPUs #0 and #1 are identified as such CPUs. The OS 310 selects, as a subject CPU, the CPU #0 among the CPUs #0 and #1.

$$r0(CPU\ \#0) = \text{deadline for thread } \#0 - \text{execution period of thread } \#0$$
$$= 10\ [ms] - 5\ [ms]$$
$$= 5\ [ms]$$

$$pst\_high(CPU\ \#0) = r0 \times \text{standby power consumption per unit time of thread } \#0\ [mW/ms]$$
$$= 5\ [ms] \times 100\ [mW/ms]$$
$$= 500\ [mW]$$

$$pst\_low(CPU\ \#0) = \text{execution period of thread } \#0 \times$$
$$(\text{standby power consumption per unit time of thread } \#1 + \text{standby power consumption per unit time of thread } \#3)$$
$$= 5\ [ms] \times (100\ [mW/ms] + 80\ [mW/ms])$$
$$= 900\ [ms]$$

The OS 310 substitutes calculated values from the above equations in the inequality (1) and determines whether the inequality (1) is satisfied.

5 [ms] (r0(CPU #0))>(3 [ms] (execution period of thread #1)∨2 [ms] (execution period of thread #3)∧500 [mW](pst_high (CPU #0))<900 [ms] (pst_low (CPU #0))

When determining that the inequality (1) is satisfied, the OS 310 identifies a thread of which the standby power consumption per unit time is the greatest among the standby power consumption per unit time of assigned threads satisfying "r0 (CPU #0)>(3 [ms] (execution period of thread #1) ∨ 2 [ms] (execution period of thread #3))". The OS 310 then selects the identified thread as a thread to be executed before the thread #0. The OS 310 outputs the result of the selection to a memory area, such as the shared memory 302, as execution sequence information.

Execution Order Information of CPU #0: Thread #1

The OS 310 performs calculations expressed as the equations (2) to (5).

$$ptotal(CPU\ \#0) = ptotal(CPU\ \#0) + \text{execution period of thread } 1 \times \text{standby power consumption per unit time of thread } \#0$$
$$= 0 + 3\ [ms] \times 100\ [mW/ms]$$
$$= 300\ [mW]$$

$$pst\_high(CPU\ \#0) = pst\_high(CPU\ \#0) - \text{execution period of thread } \#1 \times \text{standby power consumption per unit time of thread } \#0$$
$$= 500\ [ms] - 3\ [ms] \times 100\ [mW/ms]$$
$$= 200\ [mW]$$

$$pst\_low(CPU\ \#0) = pst\_low(CPU\ \#0) - \text{execution period of thread } \#1 \times \text{standby power consumption per unit time of thread } \#0$$
$$= 900\ [ms] - 3\ [ms] \times 100\ [mW/ms]$$
$$= 600\ [mW]$$

$$r0(CPU\ \#0) = r0(CPU\ \#0) - \text{execution period of thread } \#1$$
$$= 5\ [ms] - 3\ [ms]$$
$$= 2\ [ms]$$

The OS 310 then determines whether the inequality (6) is satisfied.

200 [mW]<600 [mW]

When determining that the inequality (6) is satisfied, the OS 310 selects a thread of which the standby power consumption per unit time is the greatest among the standby power consumption per unit time of assigned threads satisfying "r0 (CPU #0)<(execution period of thread #3)", as a thread to be executed after the preceding thread and before the subject thread. The OS 310 adds the result of the selection to the above execution sequence information of the CPU #0.
Execution Order Information of CPU #0: Thread #1→Thread #3

The OS 310 then performs the calculation expressed as equation (2).

$$ptotal\ (CPU\ \#0) = ptotal\ (CPU\ \#0) + \text{execution period of}$$
$$\text{thread } \#3 \times \text{standby power consumption}$$
$$\text{per unit time of thread } \#0$$
$$= 300\ [\text{mW}] + 2\ [\text{ms}] \times 100\ [\text{mW/ms}]$$
$$= 500\ [\text{mW}]$$

Because the threads #1 and #3 are all the threads already assigned to the CPU #0, the thread #0 is added to the execution sequence information of CPU #0.
Execution Order Information of CPU #0: Thread #1→Thread #3→Thread #0

Subsequently, the OS 310 selects the CPU #1 as a subject CPU, among the CPUs #0 and #1.

$$r0(CPU\ \#0) = \text{deadline for thread } \#0 - \text{execution period of}$$
$$\text{thread } \#0$$
$$= 10\ [\text{ms}] - 5\ [\text{ms}]$$
$$= 5\ [\text{ms}]$$

$$pst\_high\ (CPU\ \#1) = r0 \times \text{standby power consumption per}$$
$$\text{unit time of thread } \#0\ [\text{mW/ms}]$$
$$= 5\ [\text{ms}] \times 100\ [\text{mW/ms}]$$
$$= 500\ [\text{mW}]$$

$$pst\_low\ (CPU\ \#1) = \text{execution period of thread } \#0 \times$$
$$(\text{standby power consumption per unit}$$
$$\text{time of thread } \#2 + \text{standby power}$$
$$\text{consumption per unit time of thread } \#4)$$
$$= 5\ [\text{ms}] \times (50\ [\text{mW/ms}] + 70\ [\text{mW/ms}])$$
$$= 600\ [\text{ms}]$$

The OS 310 substitutes calculated values from the above equations into the inequality (1) and determines whether the inequality (1) is satisfied.

5 [ms] (*r*0(CPU #1))>(4 [ms] (execution period of thread #2)∨5 [ms] (execution period of thread #4)∧500 [mW] (*pst*_high (CPU #1))<600 [ms] (*pst*_low (CPU #1))

When determining that the inequality (1) is satisfied, the OS 310 identifies a thread of which the standby power consumption per unit time is the greatest among the standby power consumption per unit time of assigned threads satisfying "r0 (CPU #1)>(4 [ms] (execution period of thread #2))". The OS 310 then selects the identified thread as a thread to be executed before the thread #0. The OS 310 outputs the result of the selection to the memory area, such as the shared memory 302, as execution sequence information.

Execution Order Information of CPU #1: Thread #2

The OS 310 then performs the calculation expressed by equation (2).

$$ptotal\ (CPU\ \#1) = ptotal\ (CPU\ \#1) + \text{execution period of}$$
$$\text{thread } 2 \times \text{standby power consumption}$$
$$\text{per unit time of thread } \#0$$
$$= 0 + 4\ [\text{ms}] \times 100\ [\text{mW/ms}]$$
$$= 400\ [\text{mW}]$$

Because a thread for which an execution period is less than r0 (CPU #1) is the thread #2 only, the thread #0 is added to the execution sequence information of the CPU #1 and the thread #4 is also added to the information.
Execution Order Information of CPU #1: Thread #2→Thread 0→Thread #4

The OS 310 then determines one of the CPUs #0 and #1 that has the greater ptotal value to be an assignment destination CPU for the thread #0. ptotal (CPU #0) is calculated to be 500 [mW] while ptotal (CPU #1) is calculated to be 400 [mW]. Hence, the CPU #0 is determined to be the assignment destination CPU for the thread #0.

FIG. 8 is an explanatory diagram of an example of updating of the assignment management table 500. The OS 310 enters "CPU #0" and "thread #0" into the CPU identification information field 501 and the assigned thread identification information field 503 in the assignment management table 500, respectively. The OS 310 enters "exe" into the execution status field 504 for the thread #1, and for the threads #3 and #0, enters "proh". The OS 310 then starts executing the thread #1.

Figure 9:
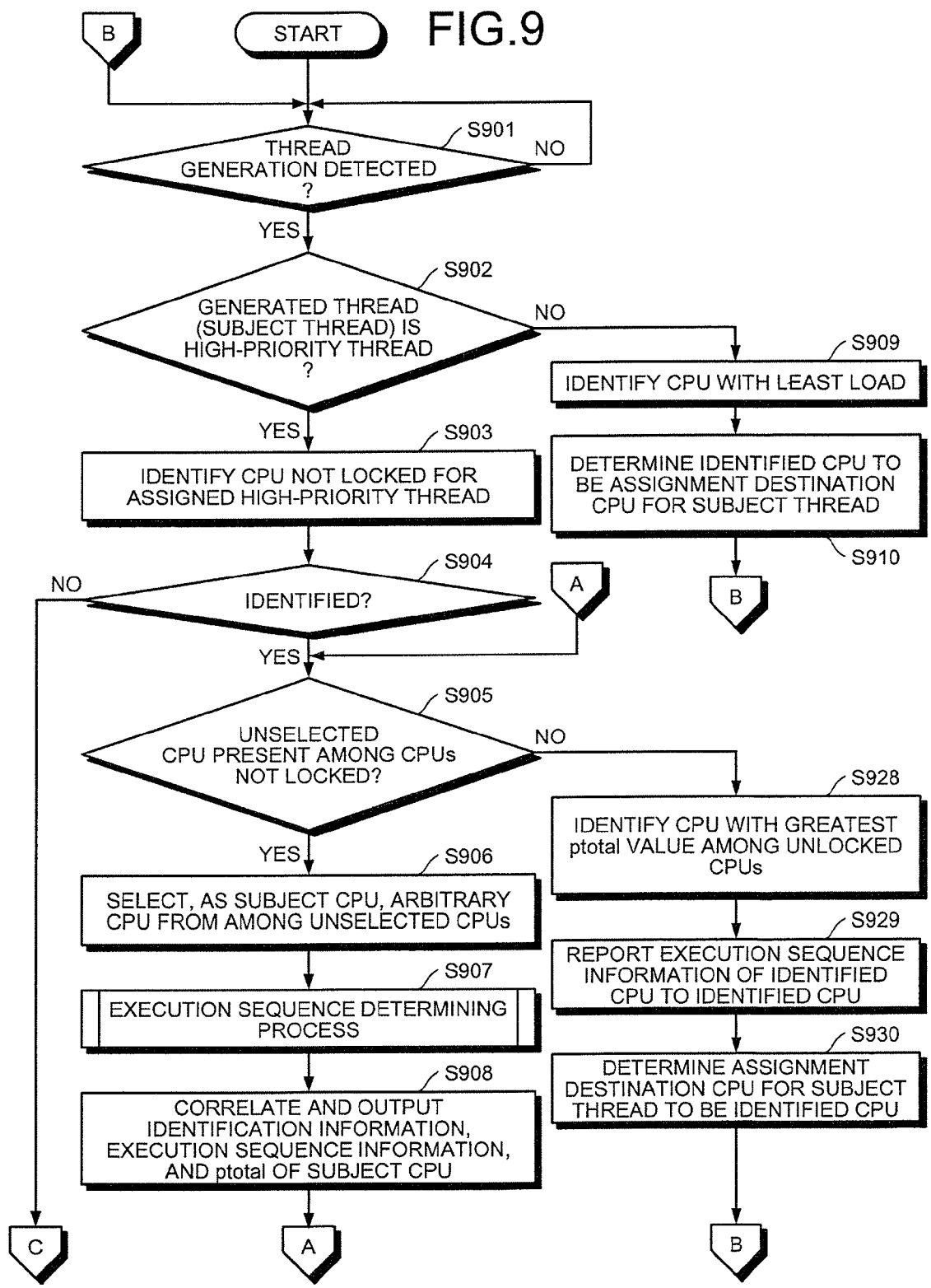
FIGS. 9, 10, and 11 are flowcharts of an information processing procedure by the information processing apparatus 300.
Figure 10:
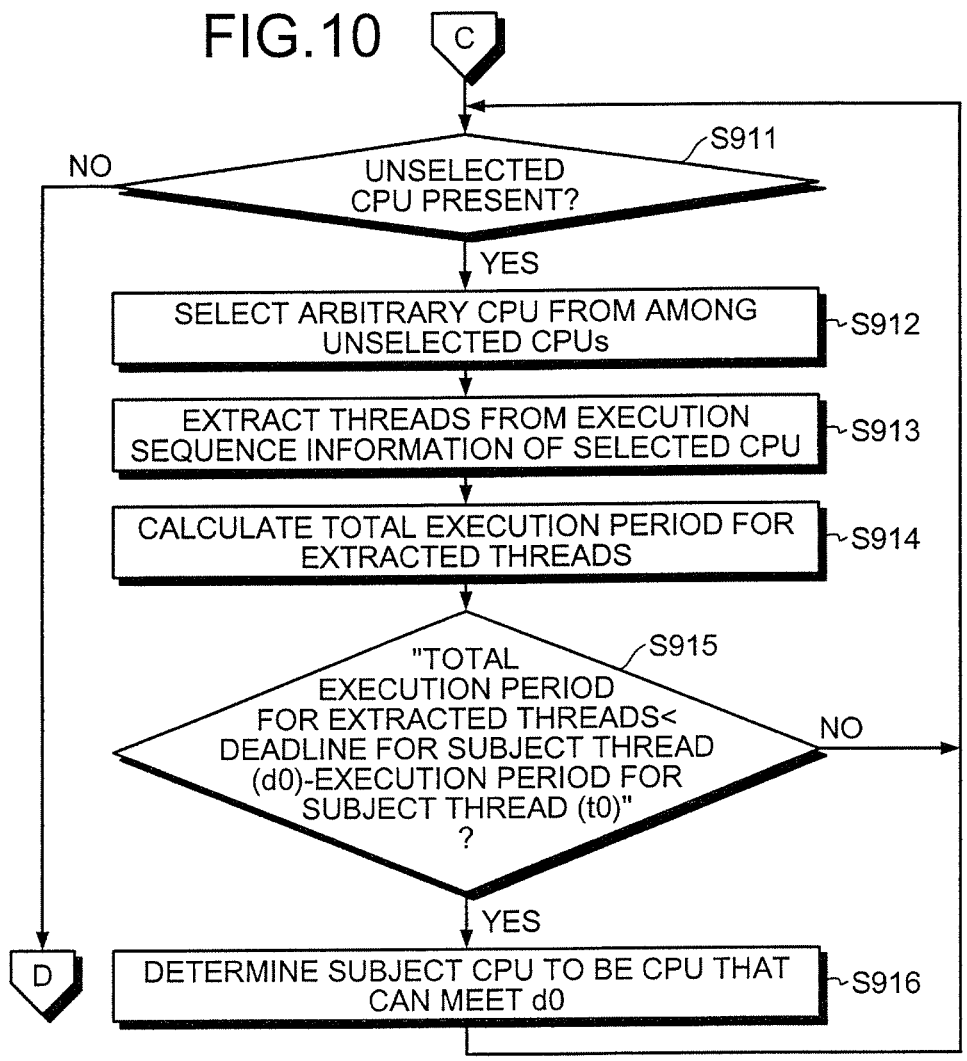
Figure 11:
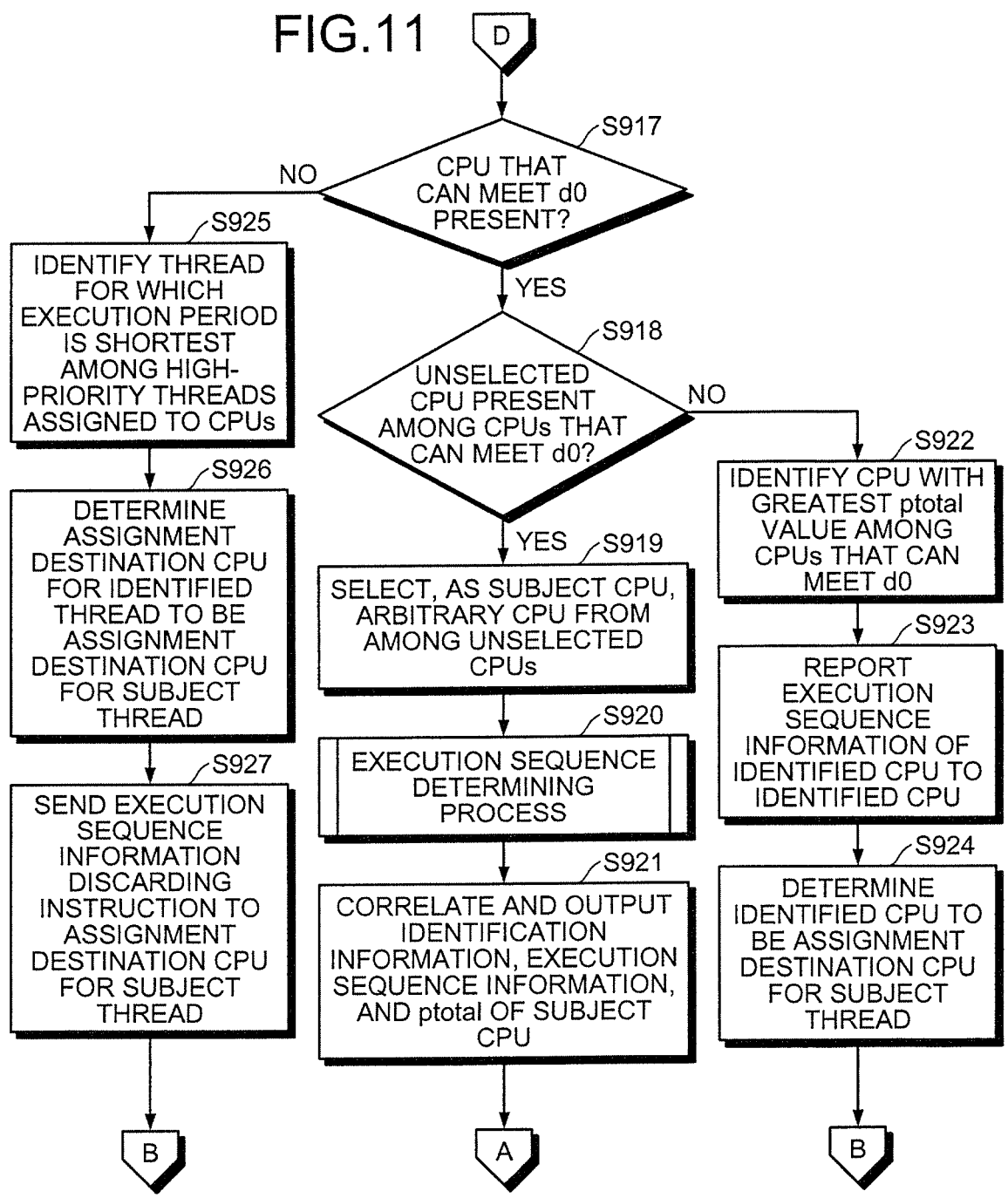

FIGS. 9, 10, and 11 are flowcharts of an information processing procedure by the information processing apparatus 300. The master OS 310 executes the procedure. The OS 310 determines whether the generation of a thread has been detected (step S901). If no generation of a thread has been detected (step S901: NO), the OS 301 returns to step S901. If the generation of a thread has been detected (step S901: YES), the OS 301 determines whether the generated thread (subject thread) is a high-priority thread (step S902).

If the subject thread is a high-priority thread (step S902: YES), the OS 310 identifies a CPU not locked for an assigned high-priority thread (step 903). The OS 310 thus determines whether a CPU not locked for an assigned high-priority thread has been identified (step 904).

If a CPU not locked for an assigned high-priority thread has been identified (step 904: YES), the OS 310 determines whether an unselected CPU is present among CPUs not locked (step S905).

If an unselected CPU is present (step S905: YES), the OS 310 selects, as a subject CPU, an arbitrary CPU from among unselected CPUs (step S906). The OS 310 then executes an execution sequence determining process (step S907), correlates and outputs identification information, execution sequence information, and ptotal of the subject CPU (step S908), and returns to step S905.

If the subject thread is not a high-priority thread (step S902: NO), the OS 310 identifies a CPU with the least load (step S909). The OS 310 determines the CPU identified to have the least load to be the assignment destination CPU for the subject thread (step S910), and returns to step S901.

If no CPU not locked for an assigned high-priority thread is identified (step 904: NO), the OS 310 determines whether an unselected CPU is present (FIG. 10, step S911). If an unselected CPU is present (step S911: YES), the OS 310 selects an arbitrary CPU from among unselected CPUs (step S912).

The OS 310 extracts threads from execution sequence information of the selected CPU (step S913), and calculates the total execution period for the extracted threads (step S914). The OS 310 determines whether "total execution period for extracted threads<deadline for subject thread (d0)−execution period for subject thread (t0)" is satisfied (step S915).

If "total of execution periods for extracted threads<d0−t0" is satisfied (step S915: YES), the OS 310 determines the subject CPU to be a CPU that can meet d0 (step S916), and returns to step S911. If "total of execution periods for extracted threads<d0−t0" is not satisfied (step S915: NO), the OS 310 returns to step S911.

If no unselected CPU is present (step S911: NO), the OS 310 determines whether a CPU that can meet d0 is present (step S917). If a CPU that can meet d0 is present (step S917: YES), the OS 310 determines whether an unselected CPU is present among CPUs that can meet d0 (step S918).

If an unselected CPU is present among the CPUs that can meet d0 (step S918: YES), The OS 310 selects, as a subject CPU, an arbitrary CPU from among unselected CPUs (step S919). The OS 310 then executes the execution sequence determining process (step S920), correlates and outputs identification information, execution sequence information, and ptotal of the subject CPU (step S921), and returns to step S905.

At step S918, if no unselected CPU is present among the CPUs that can meet d0 (step S918: NO), the OS 310 identifies a CPU with the greatest ptotal value among the CPUs that can meet d0 (step S922). The OS 310 reports execution sequence information of the identified CPU to the identified CPU (step S923), determines the identified CPU to be the assignment destination CPU for the subject thread (step S924), and returns to step S901.

If no CPU that can meet d0 is present (step S917: NO), the OS 310 identifies a thread for which the execution period is the shortest among high-priority threads assigned to each CPU (step S925). The OS 310 then determines an assignment destination CPU for the identified thread to be the assignment destination CPU for the subject thread (step S926), sends an execution sequence information discarding instruction to the assignment destination CPU for the subject thread (step S927), and returns to step S901.

At step S905, if no unselected CPU is present (step S905: NO), the OS 310 identifies a CPU with the greatest ptotal value among the unlocked CPUs (step S928). The OS 310 then reports execution sequence information of the identified CPU to the identified CPU (step S929), determines the assignment destination CPU for the subject thread to be the identified CPU (step S930), and returns to step S901.

Figure 12:
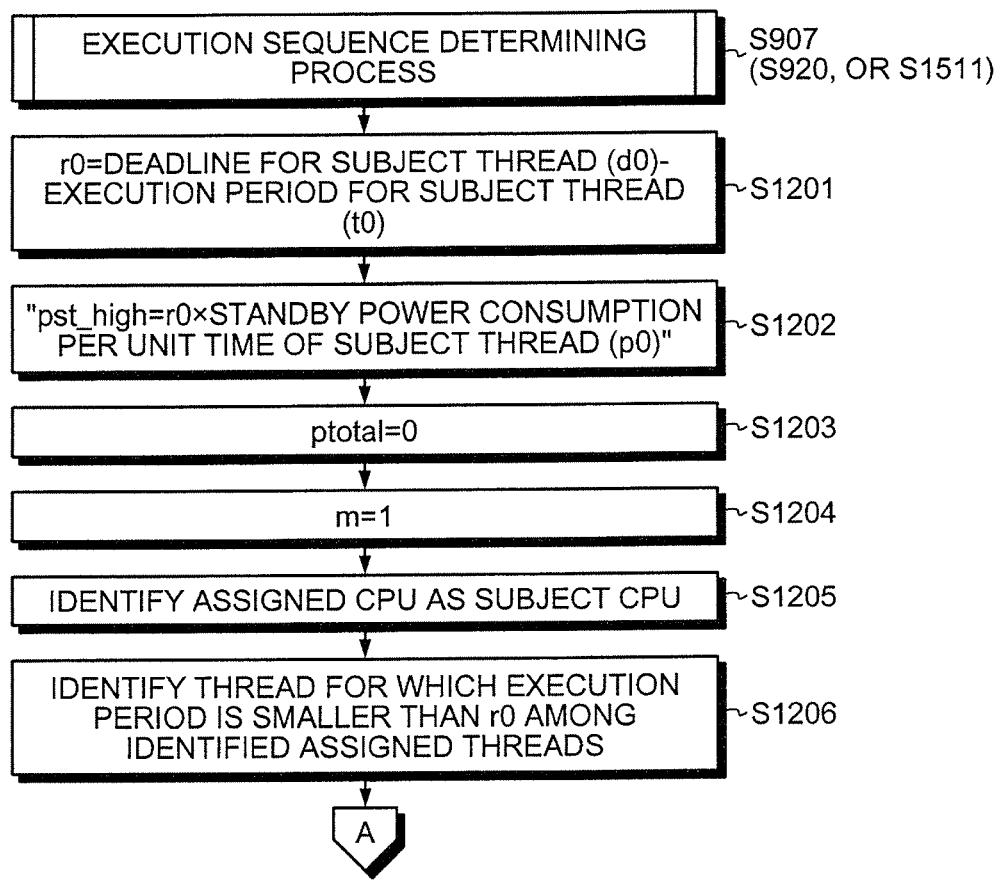
FIGS. 12 and 13 are flowcharts of a detailed procedure of an execution sequence determining process (step S907) in FIG. 9.
Figure 13:
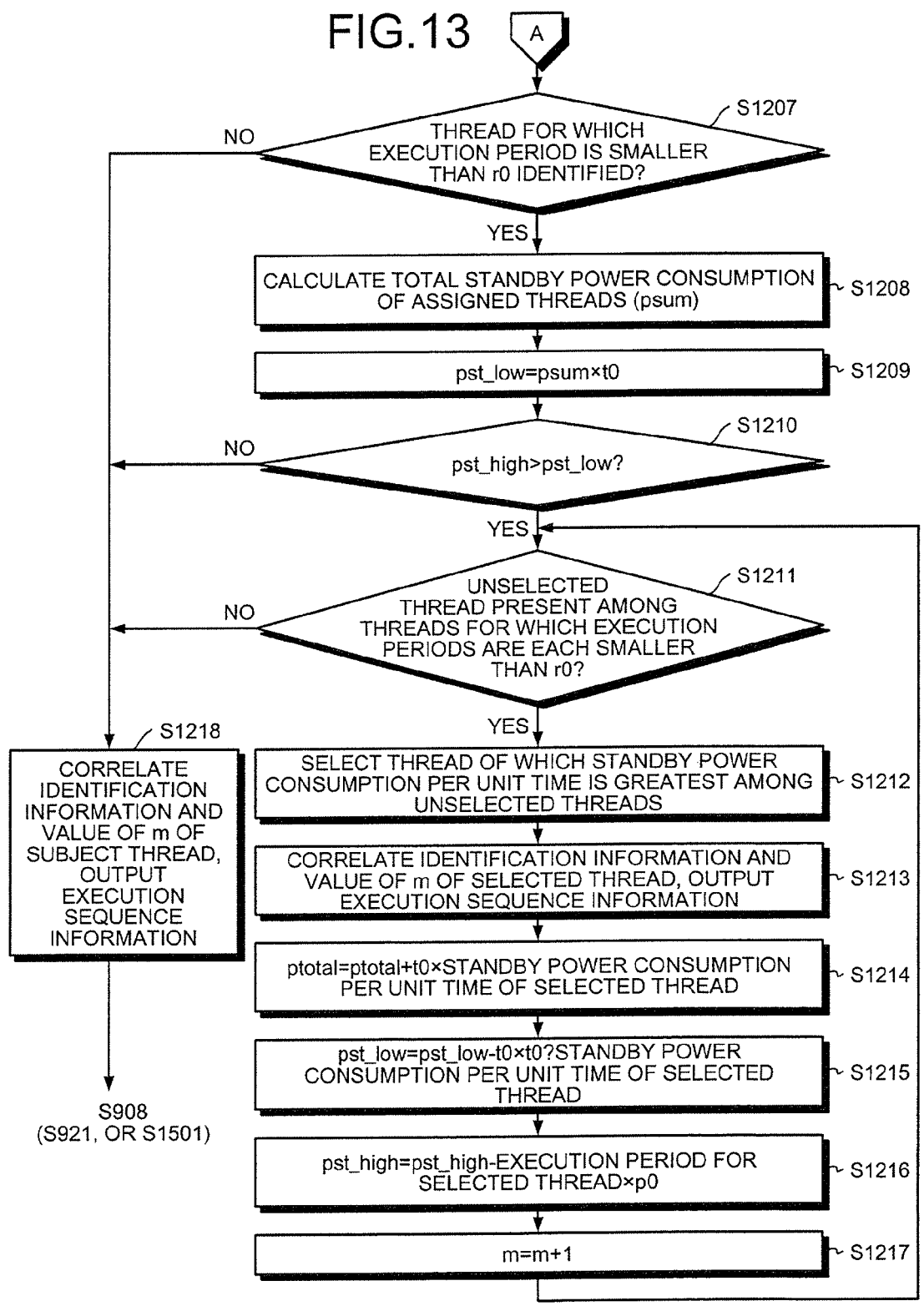

FIGS. 12 and 13 are flowcharts of a detailed procedure of the execution sequence determining process (step S907) in FIG. 9. When the execution sequence determining process is the process of step S907 or step S920, the OS 310 executes the process. However, when the execution sequence determining process is a process of step S1511 (FIG. 15), each OS executes the process. The OS performs a calculation expressed as "r0=deadline for subject thread (d0)−execution period for subject thread (t0)" (step S1201), and performs a calculation expressed as "pst_high=r0×standby power consumption per unit time of subject thread (p0)" (step S1202).

The OS then sets ptotal=0 (step S1203), sets m=1 (step S1204), and identifies an assigned CPU as a subject CPU (step 1205). The OS identifies a thread for which an execution period is smaller than r0 among identified assigned threads (step S1206). The OS thus determines whether a thread for which an execution period is smaller than r0 has been identified (FIG. 13, step S1207).

If a thread for which an execution period is smaller than r0 has been identified (step S1207: YES), the OS calculates the total standby power consumption of the assigned threads (psum) (step S1208). The OS performs a calculation expressed as "pst_low=psum×t0" (step S1209), and determines whether "pst_high>pst_low" is satisfied (step S1210).

If "pst_high>pst_low" is satisfied (step S1210: YES), the OS determines whether an unselected thread is present among threads for which execution periods are each smaller than r0 (step S1211). If an unselected thread is present (step S1211: YES), the OS selects a thread of which the standby power consumption per unit time is the greatest among unselected threads (step S1212).

The OS then correlates identification information and the value of m of the selected thread and adds the identification information and value of m to execution sequence information (step S1213). The OS performs a calculation expressed as "ptotal=ptotal+t0×standby power consumption per unit time of selected thread" (step S1214) and performs a calculation expressed as "pst_low=pst_low−t0×standby power consumption per unit time of selected thread" (step S1215).

The OS performs a calculation expressed as "pst_high=pst_high-execution period for selected thread× p0" (step S1216), sets m=m+1 (step S1217), and returns to step S1211.

At step S1207, if no thread for which an execution period is smaller than r0 is identified (step S1207: NO), the OS correlates identification information and the value of m of the subject thread, adds the identification information and value of m to execution sequence information (step S1218), and proceeds to step S908.

At step S1210, if "pst_high>pst_low" is not satisfied (step S1210: NO), the OS proceeds to step S1218.

At step S1211, if no unselected thread is present (step S1211: NO), the OS proceeds to step S1218.

Figure 14:
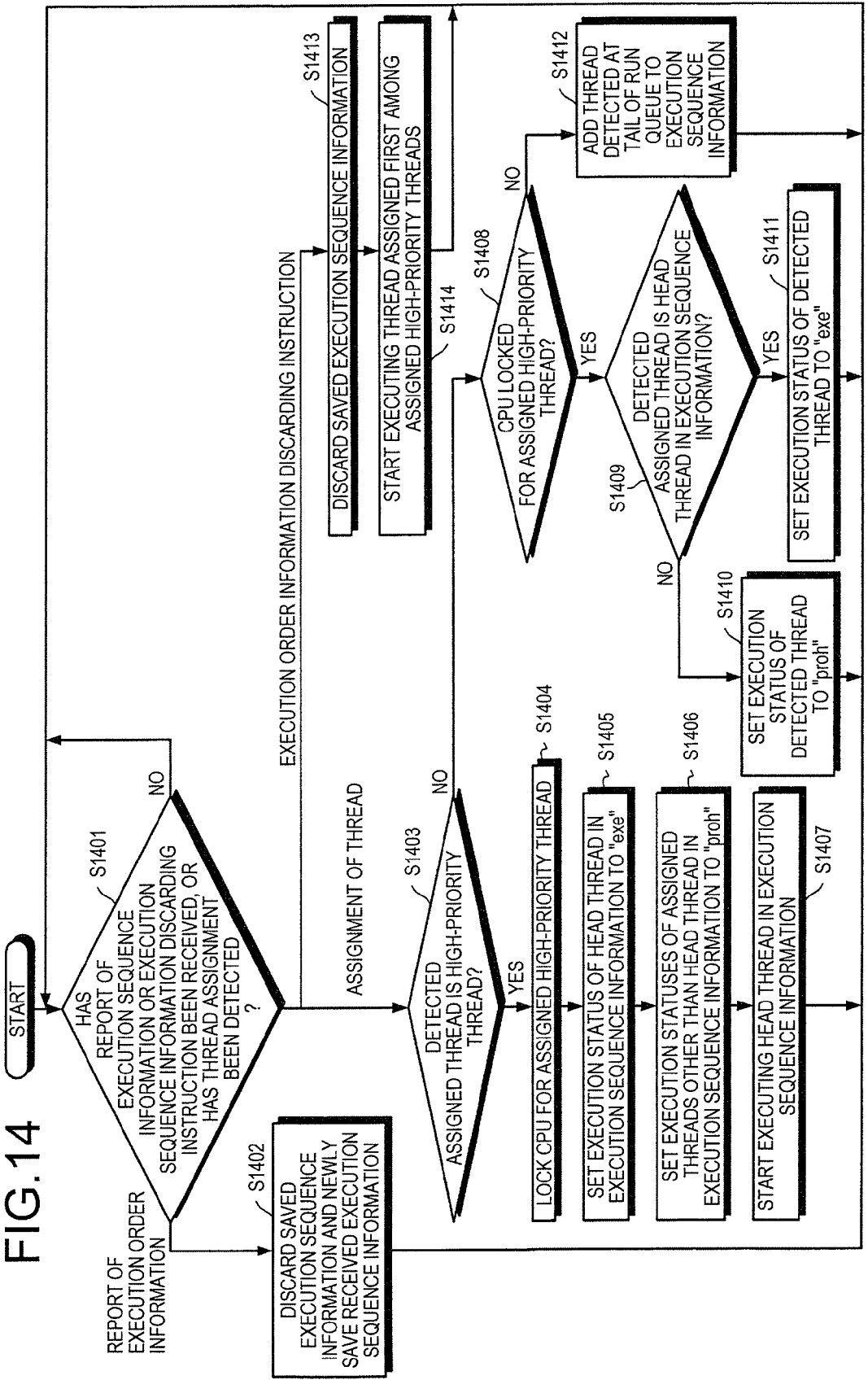
FIG. 14 is a flowchart of an information processing procedure executed by each OS when a thread is assigned.

FIG. 14 is a flowchart of an information processing procedure executed by each OS when a thread is assigned. The OS determines if a report of execution sequence information or an execution sequence information discarding instruction has been received, or if assignment of a thread has been detected (step S1401). If no report of execution sequence information or an execution sequence information discarding instruction has been received, or if an assignment of a thread is not detected (step S1401: NO), the OS returns to step S1401.

If a report of execution sequence information has been received (step S1401: REPORT OF EXECUTION ORDER INFORMATION), the OS discards saved execution sequence information and newly saves the received execution sequence information (step S1402).

If assignment of a thread has been detected (step S1401: ASSIGNMENT OF THREAD), the OS determines whether the detected assigned thread is a high-priority thread (step S1403). If the detected assigned thread is a high-priority thread (step S1403: YES), the OS locks a CPU for the assigned high-priority thread (step S1404).

The OS then sets the execution status of the head thread in execution sequence information to "exe" (step S1405) and sets the execution statuses of assigned threads other than the head thread in the execution sequence information to "proh"

(step S1406). The OS then starts executing the head thread in the execution sequence information (step S1407), and returns to step S1401.

At step S1403, if the detected assigned thread is not a high-priority thread (step S1403: NO), the OS determines whether the CPU is locked for an assigned high-priority thread (step S1408). If the CPU is locked for an assigned high-priority thread (step S1408: YES), the OS determines whether the detected assigned thread is the head thread in the execution sequence information (step S1409).

If the detected assigned thread is not the head thread in the execution sequence information (step S1409: NO), the OS sets the execution status of the detected thread to "proh" (step S1410), and returns to step S1401. If the detected assigned thread is the head thread in the execution sequence information (step S1409: YES), the OS sets the execution status of the detected thread to "exe" (step S1411), and returns to step S1401.

At step S1408, if the CPU is not locked for an assigned high-priority thread (step S1408: NO), the OS adds a thread detected at the tail of a run queue to the execution sequence information (step S1412), and returns to step S1401.

At step S1401, if an execution sequence information discarding instruction has been received (step S1401: EXECUTION ORDER INFORMATION DISCARDING INSTRUCTION), the OS discards saved execution sequence information (step S1413). The OS then starts executing a thread assigned first among assigned high-priority threads (step S1414), and returns to step S1401.

FIG. 15 is a flowchart of an information processing procedure executed by each OS when a thread is completed. The OS determines whether the end or switching of a thread has been detected (step S1501). If the end or switching of a thread has not been detected (step S1501: NO), the OS returns to step S1501.

If the end of a thread has been detected (step S1501: END OF THREAD), the OS determines whether the thread that has ended is a high-priority thread (step S1502). If the thread is not a high-priority thread (step S1502: NO), the OS determines whether a CPU is locked for an assigned high-priority thread (step S1503).

If the CPU is locked for an assigned high-priority thread (step S1503: YES), the OS progresses to step S1509. If the CPU is not locked for an assigned high-priority thread (step S1503: NO), the OS progresses to step S1505.

If the thread that has ended is a high-priority thread (step S1502: YES), the OS determines whether a high-priority thread other than the thread that has ended is present among assigned threads (step S1504). If no high-priority thread other than the thread that has ended is present among the assigned threads (step S1504: NO), the OS releases the CPU from the locked state for an assigned high-priority thread (S1505).

The OS then sets execution statuses of all the assigned threads to "exe" (step S1506), starts executing the thread assigned first among the assigned threads (step S1507), and returns to step S1501.

At step S1504, if a high-priority thread other than the ended thread is present among the assigned threads (step S1504: YES), the OS determines that whether an unselected thread is present among execution sequence information (step S1508). If an unselected thread is present among the execution sequence information (step S1508: YES), the OS sets the execution status of the head thread of unselected threads in the execution sequence information to "exe" (step S1509).

The OS starts executing the head thread (step S1510), and returns to step S1501. If no unselected thread is present among the execution sequence information (step S1508: NO), the OS executes the execution sequence determining process (step S1511), and returns to step S1501.

As described above, according to the information processing apparatus, the information processing program, and the information processing method, when the first and second threads are unexecuted, the order of execution of the threads is determined by comparing the standby power consumption of the first thread and that of the second thread. As a result, lower power consumption is achieved without thread switching.

If the standby power consumption of the first thread is greater than or equal to the standby power consumption of the second thread, the first thread is executed first and then the second thread is executed. In this manner, by first executing a thread having greater standby power consumption, lower power consumption is achieved.

If the standby power consumption of the first thread is less than the standby power consumption of the second thread, the second thread is executed first and then the first thread is executed. In this manner, by executing a thread consuming greater standby power consumption first, lower power consumption is achieved.

If an execution deadline is defined for the first thread, whether the first thread can meet the execution deadline if the second thread is executed before execution of the first thread is determined. If the first thread can meet the execution deadline even if the second thread is executed before execution of the first thread, the order of execution is determined based on the standby power consumption of the first thread and the standby power consumption of the second thread. Through this procedure, lower power consumption is achieved even when a thread with an execution deadline is executed.

If the first thread cannot meet the execution deadline if the second thread is executed before execution of the first thread, the order of execution is determined to be execution of the first thread followed by the second thread. This prevents a decline in throughput of the first thread.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
detect an unexecuted first thread and an unexecuted second thread;
calculate standby power consumption of the first thread during waiting for a completion of an execution of the second thread in a case of executing the second thread followed by the first thread, by multiplying an execution period of the second thread and standby power consumption per unit time of the first thread;
calculate standby power consumption of the second thread during waiting for a completion of an execution of the first thread in a case of executing the first thread followed by the second thread, by multiplying an execution period of the first thread and standby power consumption per unit time of the second thread;

determine an order of execution of the first thread and the second thread, based on comparison of the standby power consumption of first thread and the standby power consumption of the second thread;

calculate, when an execution deadline is defined for the first thread, a time difference of a period from a generation time of the first thread to the execution deadline and an execution period for the first thread; and determine whether the time difference is greater than the execution period for the second thread, upon determining that the time difference is greater than the execution period for the second thread, calculate the standby power consumption of the first thread, by multiplying the execution period of the second thread and the standby power consumption per unit time of the first thread, or upon determining that the time difference is greater than the execution period for the second thread, calculate the standby power consumption of the second thread, by multiplying the execution period of the first thread and the standby power consumption per unit time of the second thread.

2. The information processing apparatus according to claim 1, wherein the processor is further configured to determine the order of execution to be execution of the first thread followed by the second thread when the standby power consumption of the first thread is greater than or equal to the standby power consumption of the second thread.

3. The information processing apparatus according to claim 1, wherein the processor is further configured to determine the order of execution to be execution of the second thread followed by the first thread when the standby power consumption of the first thread is less than the standby power consumption of the second thread.

4. The information processing apparatus according to claim 1, wherein the processor is further configured to, upon determining that the time difference is less than or equal to the execution period of the second thread, determine the order of execution to be execution of the first thread followed by the second thread.

5. A non-transitory computer-readable medium storing an information processing program causing a processor of a computer to execute a process comprising:

detecting an unexecuted first thread and an unexecuted second thread;

calculating standby power consumption of the first thread during waiting for a completion of an execution of the second thread in a case of executing the second thread followed by the first thread, by multiplying an execution period of the second thread and standby power consumption per unit time of the first thread;

calculating standby power consumption of the second thread during waiting for a completion of an execution of the first thread in a case of executing the first thread followed by the second thread, by multiplying an execution period of the first thread and standby power consumption per unit time of the second thread;

determining an order of execution of the first thread and the second thread, based on comparison of the standby power consumption of first thread and the standby power consumption of the second thread;

calculating, when an execution deadline is defined for the first thread, a time difference of a period from a generation time of the first thread to the execution deadline and an execution period for the first thread; and determining whether the time difference is greater than the execution period for the second thread, upon determining that the time difference is greater than the execution period for the second thread, calculate the standby power consumption of the first thread, by multiplying the execution period of the second thread and the standby power consumption per unit time of the first thread, or upon determining that the time difference is greater than the execution period for the second thread, calculate the standby power consumption of the second thread, by multiplying the execution period of the first thread and the standby power consumption per unit time of the second thread.

6. An information processing method to be executed by a processor of a computer, the information processing method comprising:

detecting an unexecuted first thread and an unexecuted second thread;

calculating standby power consumption of the first thread during waiting for a completion of an execution of the second thread in a case of executing the second thread followed by the first thread, by multiplying an execution period of the second thread and standby power consumption per unit time of the first thread;

calculating standby power consumption of the second thread during waiting for a completion of an execution of the first thread in a case of executing the first thread followed by the second thread, by multiplying an execution period of the first thread and standby power consumption per unit time of the second thread;

determining an order of execution of the first thread and the second thread, based on comparison of the standby power consumption of first thread and the standby power consumption of the second thread;

calculating, when an execution deadline is defined for the first thread, a time difference of a period from a generation time of the first thread to the execution deadline and an execution period for the first thread; and determining whether the time difference is greater than the execution period for the second thread, upon determining that the time difference is greater than the execution period for the second thread, calculate the standby power consumption of the first thread, by multiplying the execution period of the second thread and the standby power consumption per unit time of the first thread, or upon determining that the time difference is greater than the execution period for the second thread, calculate the standby power consumption of the second thread, by multiplying the execution period of the first thread and the standby power consumption per unit time of the second thread.

* * * * *